(12) United States Patent
Wei

(10) Patent No.: US 6,886,169 B2
(45) Date of Patent: Apr. 26, 2005

(54) SYSTEM AND METHOD FOR STATEFUL WEB-BASED COMPUTING

(75) Inventor: Coach K. Wei, Boston, MA (US)

(73) Assignee: Nexaweb Technologies, Inc., Cambridge, MA (US)

(*) Notice: Subject to any disclaimer, the term of this patent is extended or adjusted under 35 U.S.C. 154(b) by 0 days.

(21) Appl. No.: 10/717,784

(22) Filed: Nov. 19, 2003

(65) Prior Publication Data
US 2004/0103373 A1 May 27, 2004

Related U.S. Application Data
(60) Provisional application No. 60/427,531, filed on Nov. 19, 2002.

(51) Int. Cl.[7] .............................................. G06F 15/16
(52) U.S. Cl. ....................... 719/316; 709/203; 709/219; 717/140
(58) Field of Search ................................. 719/310–320, 719/328; 715/50, 502–542, 500, 900–902; 717/140–161; 709/200–203, 217–219, 245; 705/1

(56) References Cited

U.S. PATENT DOCUMENTS

| 2002/0099850 A1 | * | 7/2002 | Farber et al. ............... 709/245 |
| 2002/0161853 A1 | * | 10/2002 | Burak et al. ................ 709/218 |
| 2002/0194388 A1 | * | 12/2002 | Boloker et al. ............. 709/310 |
| 2003/0033369 A1 | * | 2/2003 | Bernhard .................... 709/203 |
| 2003/0040937 A1 | * | 2/2003 | Gregersen et al. ............. 705/1 |
| 2003/0131051 A1 | * | 7/2003 | Lection et al. .............. 709/203 |

* cited by examiner

Primary Examiner—St. John Courtenay, III
(74) Attorney, Agent, or Firm—AKC Patents LLC; Aliki K. Collins

(57) ABSTRACT

A computing system for performing stateful distributed computing includes a client machine having a Client Runtime Environment (CRE) that is adapted to maintain the state of an application in the client machine. The CRE maintains state of the application by first retrieving a first markup document of the application, creating and storing a first object oriented representation of information contained in the first markup document. The first object oriented representation defines a first state of the application. Next, retrieving a second markup document, creating and storing a second object oriented representation of information contained in the second markup document. Finally merging the first and second object oriented representations thereby forming a new object oriented representation of information contained in the first or the second markup documents. This new object oriented representation defines a new state of said application. The CRE may further update the new state of the application by retrieving one or more additional markup documents, creating and storing one or more additional object oriented representations of information contained in the one or more additional markup documents, respectively, and merging the one or more additional object oriented representations with the new object oriented representation thereby forming an updated state of the application.

74 Claims, 11 Drawing Sheets

```
<xml>
<button id="btn1" text="This is a line of
Text" />
</xml>                              142
```

| button: Object | 144 |
|---|---|
| id: String ="btn1"<br>text: String="This is a line of Text" | |

```
<xml>
<button id="btn1" bgcolor="gray" />
</xml>                              146
```

| button: Object | 148 |
|---|---|
| id: String ="btn1"<br>bgcolor: Color =Color.gray | |

| button: Object | 154 |
|---|---|
| id: String ="btn1"<br>text: String="This is a line of Text" | |

This is a line of Text ~150

| button: Object | 156 |
|---|---|
| id: String ="btn1"<br>bgcolor: Color =Color.gray | |

SYSTEM AND METHOD FOR STATEFUL WEB-BASED COMPUTING

CROSS REFERENCE TO RELATED CO-PENDING APPLICATIONS

This application claims the benefit of U.S. provisional application Ser. No. 60/427,531 filed on Nov. 19, 2002 and entitled SYSTEM AND METHODS FOR STATEFUL WEB COMPUTING which is commonly assigned and the contents of which are expressly incorporated herein by reference.

FIELD OF THE INVENTION

The present invention relates to a system and a method for stateful web-based computing, and more particularly to distributed computing that provides reliable real-time bi-directional messaging, state maintenance, and synchronization for distributed applications in a web-based or wireless environment.

BACKGROUND OF THE INVENTION

The World Wide Web (www or web) provides a cost-effective way for enterprises to publish and distribute documents that are formatted in Hyper Text Markup Language (HTML). By publishing HTML documents in a centralized web server, enterprises can communicate with people all over the world via the ubiquitous public Internet and the universally available web browsers.

As the web grows, enterprises are looking beyond just using the web for delivering HTML documents. Enterprises and software vendors are looking to deliver business applications over the web and to perform distributed computing over the web. Distributed computing describes a type of computing in which different components and objects comprising an application can be located on different computers connected to a network. For example, a word processing application might consist of an editor component on one computer, a spell-checker object on a second computer, and a thesaurus on a third computer. In some distributed computing systems, each of the three computers could even be running a different operating system.

The web architecture could provide the same benefits for business applications as it does for web documents. These benefits include:

a) Centralized management: applications and documents can be centrally managed on the server side, giving enterprises great control of security, business logic and data.
b) Centralized deployment: enterprises do not need to touch thousands of client computers to update applications and documents, i.e., changes on the server can instantly reach all users.
c) Universal delivery: applications and documents can reside in a central server and can be delivered to any client computer that has a web browser and an Internet connection, both of which are universally available.

However, the web was originally designed for browsing linked documents and not for delivering business applications. Referring to FIG. 1, the web infrastructure 100 includes an application server 105 for running application code 106, a web server 110 that delivers HTML documents generated by the application code 106, and a web browser 130 residing in a client machine 120 and displaying HTML documents in a "click and refresh" fashion. Application code 106 is usually written using a programming language including among others C, C++, C#, Java, Javascript, VBScript, ActionScript, VisualBasic or some proprietary language. The web browser 130 communicates with the web server 110 via a request/respond communication model 140. In this request/respond communication model 140 a user places a request for a specific web page through the web browser 130 and the web browser 130 sends the request to the web server 110 using a Hyper Text Transfer Protocol (HTTP) (142). The web server 110 receives the request and transfers it to the application server 105. In the application server 105 the application code 106 processes the request and generate a response that comprises HTML documents. Next, the web server 110 responds to the request by sending the generated HTML documents to the web browser 130 (144). This web infrastructure 100 is "stateless", i.e., neither the web server 110 nor the web browser 130 maintains the state of the application. The state of an application is a snapshot of all the program objects, variables and resources at each particular moment, the value of the variables, the relationship between different program objects, and the conditions of different resources. The state of an application changes and evolves as the application runs. For example, when a user is shopping at the website of Amazon.com, the state of the shopping application includes information including among others the current user name, number of items in the shopping cart and price of each item.

As was mentioned above, in the web infrastructure 100 of FIG. 1 the state of the application is not maintained either the client machine 120 or the web server 110. The client machine 120 merely displays HTML documents and only maintains the state information of the current documents. When a new document is loaded, the state information of the previous document is discarded and replaced by the new document's state information. State information of the previous document is lost.

For example, referring to FIG. 1A, a first markup document 142, page1.xml, contains code that will display in the client machine 120 a button 150 with text "This is a line of Text". A second markup document 146, page2.xml, contains code that will change the button's 150 background color to be gray, shown as button 152. The corresponding object oriented representations 144, 148 of the first and second markup documents 142, 146, respectively, are also shown in FIG. 1A. When the client machine 120 downloads the first markup document 142, the text "This is a line of Text" 150 is displayed in the client machine 120. The application state at this moment, shown as 154, contains all the information of the first markup document 142. Following the display of the first markup document 142, the client machine 120 downloads the second markup document 146, whereby the application state at this moment, shown as 156, discards the state of the first markup document 142 and contains the state of the second markup document only. As a result, the client machine displays a blank gray button 152 wherein the text "This is a line of Text" is gone even though button 152 is still the same button as button 150.

This "stateless" nature of today's web infrastructure 100 has limited the applicability of the web for delivering business application. Business applications are inherently "stateful". For example, the response to a user's click typically depends not only on what the user clicked, but also on the state of the application, such as the history of the user's interactions, the value of a form, or even the network connectivity. Software developers today have to write an extensive amount of code to maintain such state information on the server side, typically inside an application server. The application code needs to deal not only with how to generate responses to client requests but also with how to maintain and manage the application state. In the web infrastructure 100 of FIG. 1, the state of an application is maintained by application code running inside the application server 105. Such extensive work required for maintaining application state on the server side. This increases both the development cost and the application maintenance cost.

Furthermore, an entire new markup document has to be sent to the client machine upon every request/response, even if the new markup document contains only small changes to the previous markup document. A typical markup document can have a size of 10 kilobytes to several hundred kilobytes. Transmitting such documents consumes a lot of network bandwidth and slows down the application responsiveness.

Another problem for the delivery of business applications over the current "stateless" web infrastructure is the fact that network connections may not always be available. Because no state is maintained on the client-side, web applications built on the current infrastructure are unavailable if the network connection is not available. This possibility of a "down time" is not acceptable for business applications. As a result, developers have to write client and/or server applications to support such offline operation capabilities.

The "stateless" Hyper Text Transfer Protocol (HTTP) request/response model 140 does not enable real-time, bi-directional two way communications. This HTTP communication model 140 supports only "client pull" communications, in which the user has to send a request to the server in order to get new data. A lot of business applications require "stateful" connections that are persistent, through which the web server can send real-time data updates to different client machines, i.e., a "server push" model. For example, a stock portfolio management application requires real time stock data. Whenever the stock price changes, the user needs to receive the new price immediately. As a result, developers have to write a lot of code to enable "server push", where firewall issues and other security related issues are very challenging and expensive to deal with. In summary, the challenges of enabling bi-directional communications over the Internet are three folds:

a) The Internet as network infrastructure is capable of transmitting any kind of messages. However, a lot of enterprise environments allow only HTTP traffic due to security concerns. So if the messages are not transmitted via the HTTP protocol, such messages may not be able to reach the destination due to various firewall policies.

b) HTTP is designed to function as one-way, request/response model from a web browser to a web server. A web browser will open a connection to an HTTP web server through which it sends the request. The HTTP web server responds to this request, sends the response back to the web browser, and then closes the connection. Though HTTP 1.1 added features like "Keep-Alive" that can make the connection open for a period of time during which multiple request/response pairs can be transported through the same connection, this feature is not universally supported by all web browsers or web servers. Even if it is supported by the web browser and the HTTP web server, this "Keep-Alive" connection is only available to the HTTP web server internally for sending responses to client requests. Application code running inside an application server can not use this connection for doing "server push".

c) To enable bi-directional communications over HTTP, there are various HTTP tunneling techniques available. They typically require specially built client or server software for maintaining the persistent connection, through which messages are wrapped inside the HTTP protocol for transport purpose. Such techniques introduce extra costs and potential security problems. For example, they typically require extra server software that accepts and manages persistent connections through a port other than the standard HTTP server port (port 80). This breaks the server side firewall and has significant potential security risks.

There is no current method that can provide reliable "server push" capability to application code running inside a standard application server without changing client side or server side configurations.

Furthermore, the HTTP communication model is unreliable because messages can get lost due to various network problems. HTTP does not have a way to guarantee message delivery. Losing messages may be acceptable for web browsing but unacceptable for running business applications. As a result, enterprises have to spend a lot of extra resources to solve this problem for their important applications.

In summary, the web architecture could potentially bring great benefits to business applications, such as centralized management, universal delivery and universal deployment. However, the "stateless" nature of the web architecture has limited the usage of the web for business critical applications. In order to overcome these limitations, developers have to write a lot of complex code that significantly increases development costs as well as application management and maintenance costs. Despite some costly development efforts, web-based applications perform clumsy and consume excessive network bandwidth, frequently disappointing end users. Therefore, there is a need for a "stateful" web-based delivery of business applications that overcomes the above mentioned limitations.

SUMMARY OF THE INVENTION

In general, in one aspect, the invention features a computing system for performing stateful distributed computing including a client machine comprising a Client Runtime Environment (CRE). The CRE is adapted to maintain state of an application by retrieving a first markup document of the application, and creating and storing a first object oriented representation of information contained in the first markup document. The first object oriented representation defines a first state of said application. Next, retrieving a second markup document, creating and storing a second object oriented representation of information contained in the second markup document, and merging the first and the second object oriented representations thereby forming a new object oriented representation of information contained in the first or the second markup documents. The new object oriented representation defines a new state of the application.

Implementations of this aspect of the invention may include one or more of the following features. The CRE may further update the new state of the application by retrieving one or more additional markup documents, creating and storing one or more additional object oriented representations of information contained in the one or more additional markup documents, respectively, and merging the one or more additional object oriented representations with the new object oriented representation thereby forming an updated state of the application. Any of the object oriented representations may be among others a user interface, a data structure, or business logic object. The CRE may further retrieve one or more procedural codes associated with any of the markup documents and execute the one or more procedural codes. The CRE may further comprise an Application Program Interface (API) and the one or more procedural codes may utilize the API for maintaining state of the application programmatically. The application state is maintained in a Document Object Model (DOM). The markup documents may have an Extensible Markup Language (XML) format or a Hyper Text Markup Language (HTML) format. The procedural codes may be written in a programming language including among others C, C++, C#, Java, Javascript, VBScript, ActionScript, Visual Basic, or a proprietary programming language. The procedural codes may have binary format and the binary format may be among others .NET CLR, Java.class format, or Macromedia Flash binary format. The procedural codes may have text format and the text format may be among others HTML, XML, plain text, or compressed text. The process of merging may include one or more operations and these operations may include among others add, remove, insert, change, substitute, update, combine and combinations thereof. The object oriented representations may include objects, object attributes, object attribute values, object hierarchical relationship codes and combinations therefore and the operations may be applied on these objects, object attributes, object attribute values, object hierarchical relationship codes or combinations thereof. The procedural codes and any of the markup documents may be compiled and combined into a set of procedural code and the set of procedural code is retrieved and executed by the CRE. One or more of the markup documents may be compiled into a procedural code and the procedural code may be retrieved and executed by the CRE. The system may further comprise a real-time bi-directional messaging system for sending and receiving messages between the client machine and a server over a network. The network may be the World Wide Web (web) or a wireless network. The system may further include a web browser and the CRE may run inside or outside the web browser. The client machine may be a desktop computer, a laptop computer, a handheld device, or a smart phone. The system may further include one or more servers and the client machine may retrieve any of the markup documents from any of the one or more servers.

In general, in another aspect, the invention features a computing method for maintaining state of an application in a client machine including first retrieving a first markup document of the application, and creating a first object oriented representation of information contained in the first markup document and storing the first object oriented representation, wherein the first object oriented representation defines a first state of the application. Next, retrieving a second markup document of the application and creating a second object oriented representation of information contained in the second markup document and storing the second object oriented representation. Finally, merging the first and the second object oriented representations thereby forming a new object oriented representation of information contained in the first or the second markup document. The new object oriented representation defines a new state of the application.

In general in another aspect, the invention features a method for developing an application adapted to run within a client machine that utilizes a Client Runtime Environment (CRE) for maintaining state of the application. The method includes defining user interface screens of the application as markup documents, respectively. Next, retrieving a first markup document by the CRE and creating a first object representation of information contained in the first markup document by the CRE. The first object oriented representation defines a first state of said application. Next, retrieving a second markup document by the CRE and creating a second object oriented representation of information contained in the second markup document by the CRE. Finally, merging the first and second object oriented representations by the CRE thereby forming a new object oriented representation of information contained in the first or the second markup document. The new object oriented representation defines a new state of the information.

Implementations of this aspect of the invention may include one or more of the following features. The method may further include developing business logic associated with any of the markup documents into one or more procedural codes and executing the one or more procedural codes by the CRE. The CRE may include an Application Program Interface (API) and the method may further include manipulating any of the markup documents and the application state via the API.

In general, in another aspect, the invention features a method for deploying an application adapted to run within a client machine including first deploying a Client Runtime Environment (CRE) in the client machine and deploying the application on a central server. The client machine is adapted to connect to the central server via a network and the central server is capable of serving requests from the CRE. Next, sending a first request from the CRE to the central server to download a first markup document of the application from the central server to the CRE and creating and storing a first object oriented representation of the first markup document. The first object oriented representation defines a first state of said application. Next, sending a second request from the CRE to the central server to download a second markup document of the application from the central server to the CRE and creating and storing a second object oriented representation of the second markup document. Finally, merging the first object oriented representation with the second object oriented representation thereby creating a new object oriented representation. The new object oriented representation defines a new state of the application.

Implementations of this aspect of the invention may include one or more of the following features. The CRE may further update the new state of the application by retrieving one or more additional markup documents, creating and storing one or more additional object oriented representations of information contained in the one or more additional markup documents, respectively, and merging the one or more additional object oriented representations with the new object oriented representation thereby forming an updated state of the application. Any of the object oriented representations may be among others a user interface, a data structure, or business logic object. The CRE may further retrieve one or more procedural codes associated with any of the markup documents and execute the one or more procedural codes. The procedural codes may be written in a programming language including among others C, C++, C#, Java, Javascript, VBScript, ActionScript, Visual Basic, or a proprietary programming language. The procedural codes may have binary format and the binary format may be among others .NET CLR, Java.class format, or Macromedia Flash binary format. The procedural codes may have text format and the text format may be among others HTML, XML, plain text, or compressed text. The procedural codes and any of the markup documents may be compiled and combined into a set of procedural code and the set of procedural code is retrieved and executed by the CRE. The method may further include caching a client side application code in the client machine. The client side application code may include the first and second markup documents, the new object oriented representation, one or more procedural codes and data downloaded from the central server to the client machine.

In general in another aspect the invention features a method for deploying an application adapted to run within a client machine including first deploying a Client Runtime Environment (CRE) in the client machine and deploying the application on a central server. The client machine is adapted to connect to the central server via a network and the central server is capable of serving requests from the CRE. Next, compiling and combining one or more markup documents and one or more procedural codes into an entity, and sending a request from the CRE to the central server to download the entity. Next retrieving a first markup document of the application from the entity and creating and storing a first object oriented representation of the first markup document. The first object oriented representation defines a first state of said application. Next, retrieving a second markup document of the application from the entity and creating and storing a second object oriented representation of the second markup document. Finally, merging the first object oriented representation with the second object oriented representation thereby creating a new object oriented representation. The new object oriented representation defines a new state of the application.

In general, in another aspect, the invention features a distributed data storage system having a client side DOM for storing client side data, a server side DOM for storing server side data and a client side engine and a server side engine for synchronizing the client side DOM with the server side DOM and the reverse, respectively, over a network.

Implementations of this aspect of the invention may include one or more of the following features. If the network connection between the client side engine and the server side engine is interrupted the client side engine and the server side engine keep track of changes in the client side DOM and the server side DOM, respectively, and synchronize them when the network connection is reestablished. The network may be the web or a wireless network.

In general, in yet another aspect, the invention features a distributed data storage system including a client side DOM for storing client side data, a server side DOM for storing server side data and a client side engine and a server side engine for synchronizing the client side DOM with the server side DOM and the reverse, respectively, over a network.

Implementations of this aspect of the invention may include one or more of the following features. The HTTP header may have a "Content-type" header field indicating that the server response is a "multipart" mime-type response and the certain condition is an end of the "multipart" mime-type response. The HTTP header may have a "Transfer-encoding" header field indicating that the server response is "chunked" and the certain condition is an end of the "chunked" response. The HTTP header may have a "Content-length" header field indicating that the server response is a number that is bigger than a sum of all content lengths of the plurality of messages, and the certain condition is that the total number of bytes to be delivered equals or exceeds that number.

In general, in yet another aspect, the invention features a communication system for performing "server-push" from a web application running inside an application server including a server module adapted to run inside the application server and to receive a request and to send a response to the request via a network connection and a client machine adapted to send the request to the server module and to receive the response to the request via the network connection. The server module performs 'server-push" of a plurality of messages to the client machine upon receipt of an HTTP request from the client machine and accepting an HTTP network connection opened by the client machine by sending back to the client machine a response comprising an HTTP header instructing the client machine not to close the HTTP network connection until a certain condition is met thereby maintaining the HTTP network connection open and then sending one or more of the plurality of messages to the client machine via the open HTTP network connection.

In general, in another aspect, the invention features a method for performing "server-push" of a plurality of messages from a server to a client machine including sending a normal HTTP request from the client machine to the server by opening an HTTP connection to the server and accepting the HTTP connection by the server. Next, sending back to the client machine a response by the server and the response includes an HTTP header instructing the client machine not to close the HTTP connection until a certain condition is met thereby maintaining the HTTP connection open. Finally, sending one or more of the plurality of messages to the client machine by the server via the open HTTP connection.

Among the advantages of this invention may be one or more of the following. By using the distributed computing system of this invention, software developers can write web-based applications to perform complex tasks that are not easy using the stateless web infrastructure. Because the application state is maintained on the client side, applications can be very responsive, perform complex business logic without having to make a round trip to the server. Because the application state is also available on the server side, server side business logic can dynamically query the client state without having to make a round trip to the client side, thereby significantly improving application performance. Because the client DOM and server DOM are synchronized automatically, developers do not need to write code to perform such a task, thereby lowering development cost and maintenance challenges. Such an automatic synchronization also enables optimal usage of bandwidth because it is possible to send only incremental changes between the CRE and SRE, thereby avoiding bandwidth clogging full-page refreshes and significantly lowering bandwidth consumptions.

Furthermore, because there is application state information available on both the CRE and SRE, an application can still run even if the network is not available. The changes are kept in the DOM and are automatically synchronized once the network is reconnected. This enables an entire class of applications that require offline operations to run on the present web architecture.

Furthermore, because network communication is completely managed by the CRE and the SRE, significant development and maintenance savings are achieved because developers do not need to alter the network communication. The CRE and SRE can optimize the communication layers so it is reliable and bandwidth efficient. In one example, the present invention saves 90% bandwidth as compared with HTML based computing.

Importantly, the above system makes writing applications for various devices much easier. Beyond running inside a web browser, CRE can be adapted to run on many difference devices such as Pocket PC and Handheld devices. In one example, a client program running on a mobile phone is written using XML for voice-based and form-based user interaction. A user can interact with the mobile phone using voice or an onscreen keyboard. This client program is extremely lightweight, clearly readable, and manages a voice-based user interaction in a fully functional way.

Cross platform capability is yet another benefit. Applications written using XML can run over any device as long as the device supports such CRE. For example, a rich graphical user interface (GUI) application can run on Palm devices as well as on Windows CE devices without the need for recoding. Note that such cross platform capability is quite different from the "Write Once, Run Anywhere" capability of Java programs. Java programs are written using Object Oriented Java APIs that require developers to do a lot of low level programming such as managing network communications and low level graphics drawings. Such low level programming is device dependent and not usually portable. Writing cross platform client-side Java applications is still challenging. The method of this invention provides a much higher level of abstraction that is usually portable and applications are usually written using XML directly. Low level operations are completely handled by the support infrastructure rather than being left to application developers.

Furthermore, the system of this invention provides users the capability to access and run a variety of applications on a various computing devices without downloading and installing these applications beforehand, thereby overcoming the computing power and storage limitations of these devices. Companies can store all XML applications on central servers and users can download the XML documents for these applications on the fly in their computing devices. Such XML documents can be transmitted quickly over the network, even over slow network connections, so that there is little wait time from the user's perspective. No further installation is needed. The number of available applications is not limited by the computing power available at the device, but rather by what is available on the server.

The details of one or more embodiments of the invention are set forth in the accompanying drawings and description below. Other features, objects and advantages of the invention will be apparent from the following description of the preferred embodiments, the drawings and from the claims.

BRIEF DESCRIPTION OF THE DRAWINGS

Referring to the figures, wherein like numerals represent like parts throughout the several views:

FIG. 1A is an example of first and second markup documents, the corresponding object oriented representations of the first and second markup documents, and the corresponding displays in the client machine in the prior art web-based computing system;

FIG. 6A is a screen shot of an initial XML screen as shown in the client machine;

FIG. 6B is a screen shot of an updated XML screen as shown in the client machine.

DETAILED DESCRIPTION OF THE INVENTION

Figure 2:
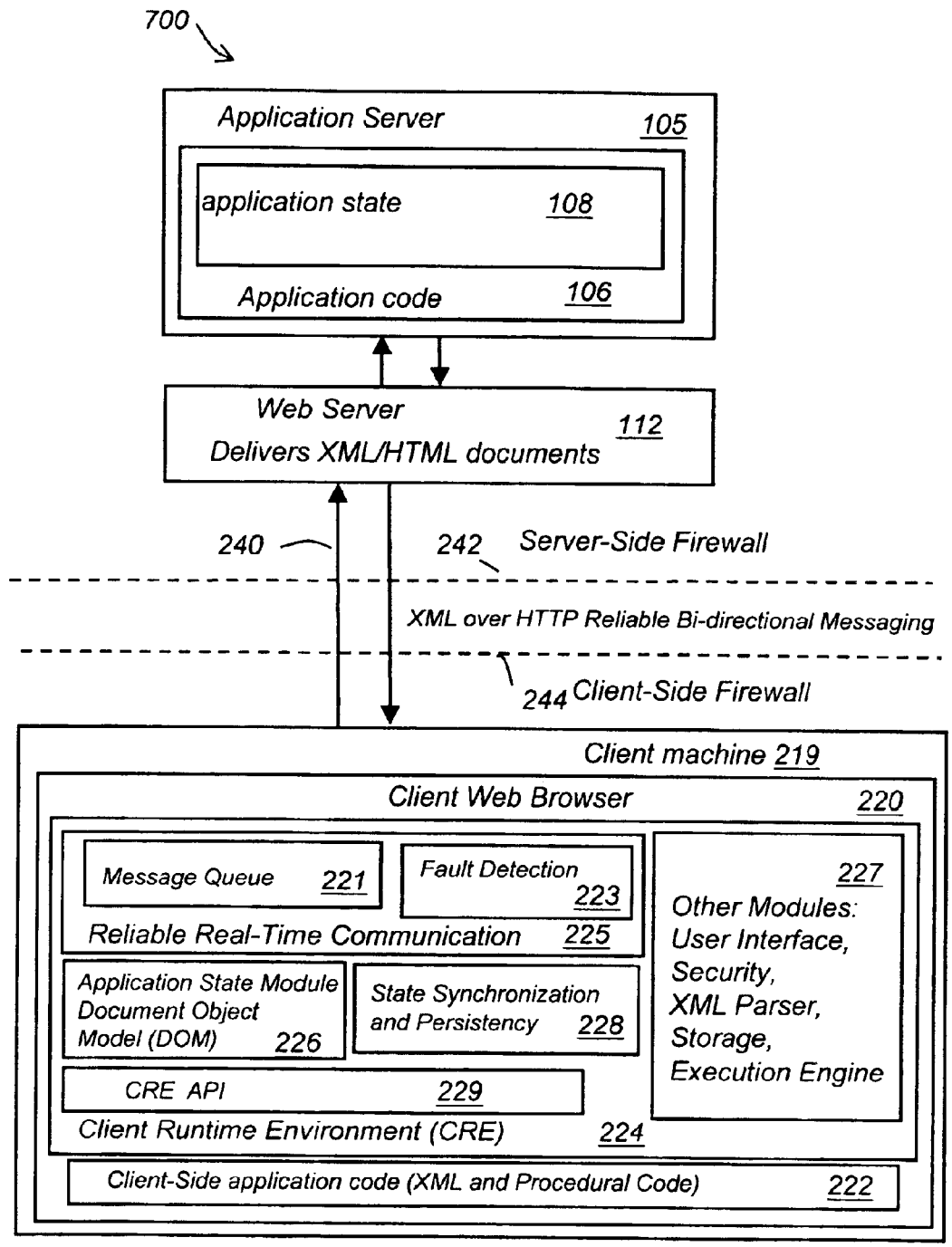
FIG. 2 is a block diagram of a first embodiment of a stateful web-based computing system of this invention.

Referring to FIG. 2, a distributed computing system 700 includes a client machine 219, a web server 112 and an application server 105. The application server 105 runs behind the web server 112, and runs server side applications 106. The web server 112 delivers HTML or XML documents generated by the server side applications 106 to a client web browser 220 residing inside the client machine 219. A real time, bidirectional, reliable messaging system 240 transmits messages between the client web browser 220 and the web server 112 over an HTTP web connection. The client machine 219 includes a client runtime environment (CRE) 224 that runs inside the client web browser 220 and client side application code 222. In other embodiments the CRE runs outside the client web browser 220. The client side application code 222 includes Extensible Markup Language (XML) documents and script. The CRE 224 is protected by a client side firewall 244 and the web server 214 is protected by a server side firewall 242. The CRE 224 includes a Document Object Model (DOM) 226, a communications module 225, a state synchronization and persistency module 228 and other functional modules 227 such as an XML parser, a user interface, storage, security, and an execution engine. The XML Parser is responsible for parsing XML documents that come from the application server 105. The parsing results may be stored in the client side DOM 226 as part of the application's client side state. The user interface module is responsible for displaying the user interface and interacting with the user according to the application's XML description. The execution engine module is capable of running client side application code 222. The DOM 226 maintains the application's client side state and is updated by the CRE automatically. The synchronization and persistency module 228 is responsible for synchronizing the DOM 226 with the application server 1050, and saving and/or retrieving the DOM 226 from persistent storage.

Figure 1:
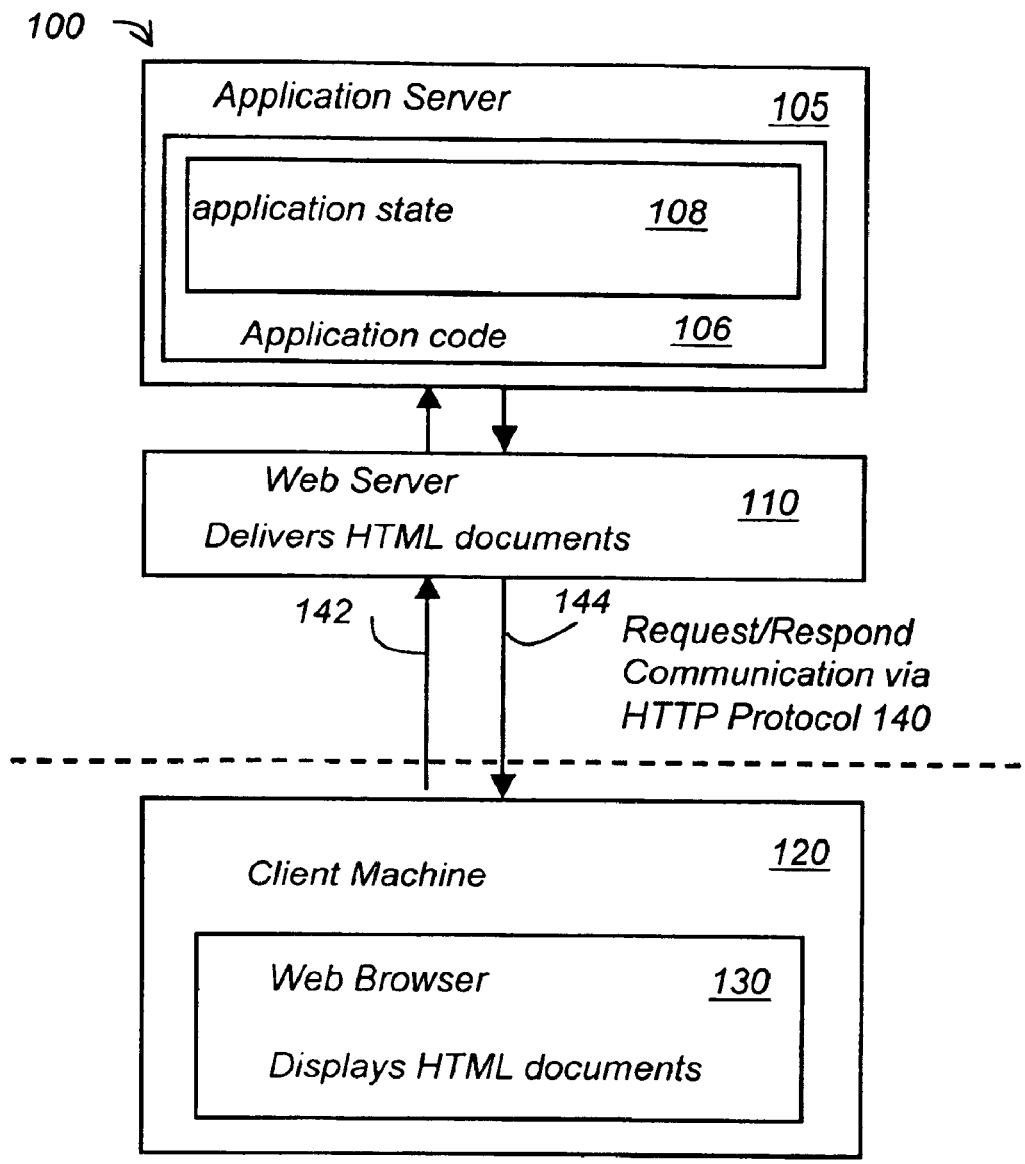
FIG. 1 is a block diagram of a stateless prior art web-based computing system.
Figure 2A:
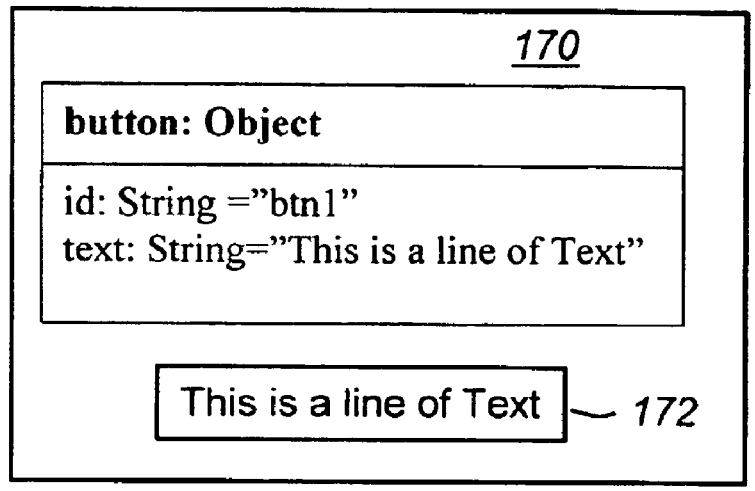
FIG. 2A depicts the first and second displays of the example of FIG. 1A in the stateful web-based computing system of FIG. 2.
Figure 2A:
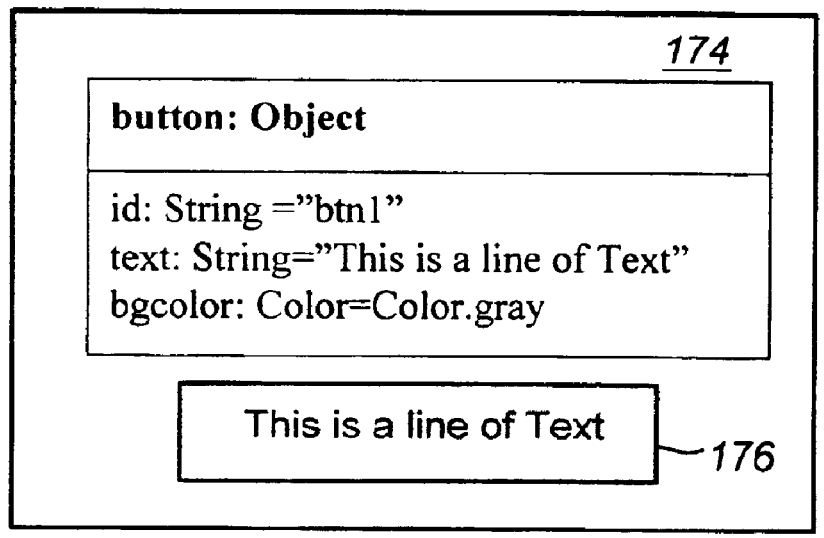

Referring back to FIG. 1A and FIG. 2A, the computing system 700 of FIG. 2 maintains the state of the application in the client side DOM 226 according to following process. First the CRE 224 retrieves a first markup document 142 of page1.xml from the application server 105 and process it into a first object oriented representation 144. The first markup document 142 contains code that will display text saying "This is a line of Text" 150 in the client machine 120. Next the CRE 224 retrieves a second markup document 146 of page2.xml from the application server 105 and processes it into a second oriented representation 148. The second markup document 146 contains code that will display a gray button 152 in the client machine 120. Next the CRE 224 merges the information contained in the first and second object oriented representations 144 and 146 and creates a new object oriented representation 174. The new object oriented representation 174 displays the text "This is a line of Text" in a gray button background 176, thereby maintaining the state of the first and second markup documents 142, 146. The object oriented representations 142, 144, and 174 are stored in the client side DOM 226.

Figure 4:
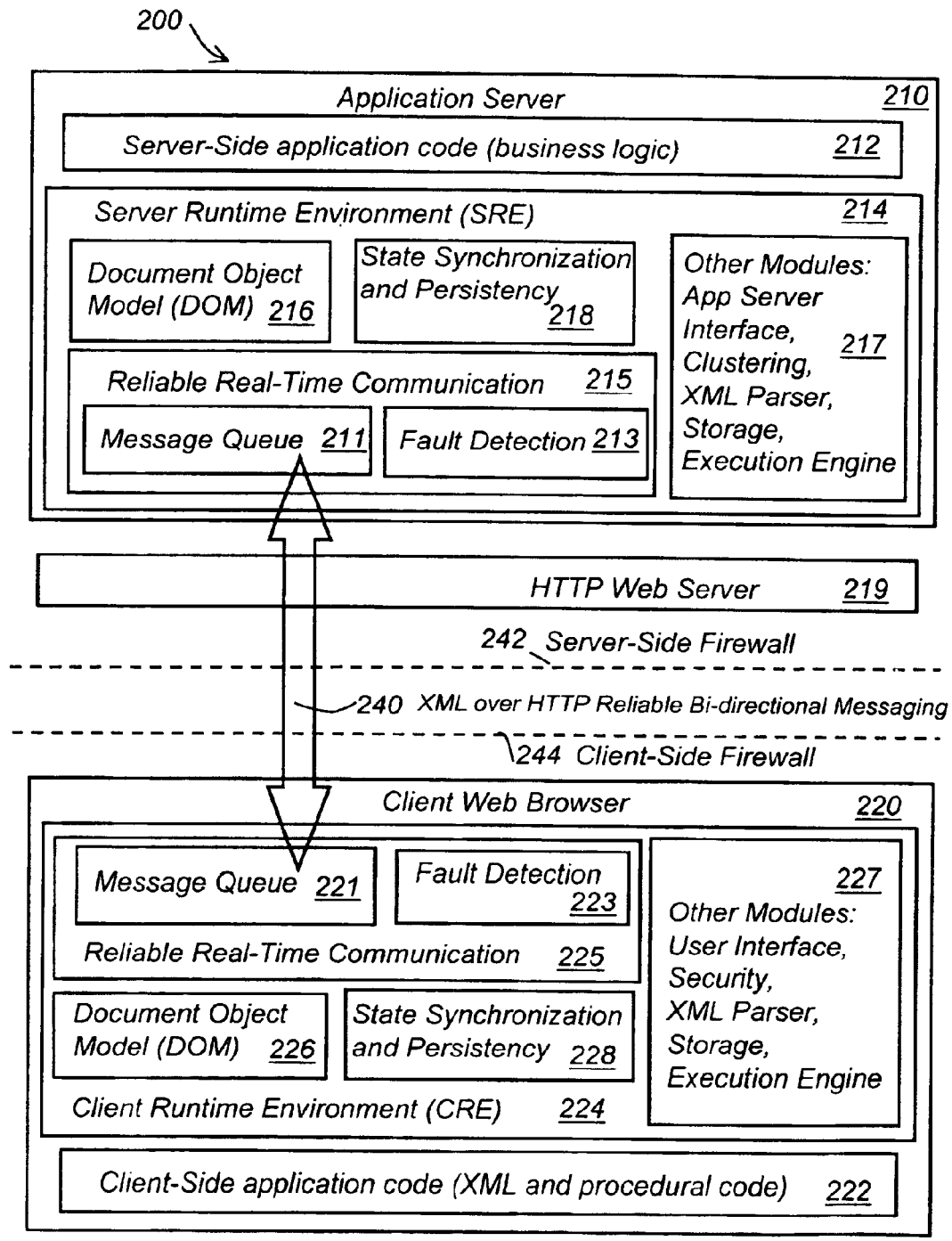
FIG. 4 is a block diagram of yet another embodiment of a stateful computing system of this invention.

Referring to FIG. 4, the distributed computing system 200 includes a client runtime environment (CRE) 224 that runs inside a client web browser 220, an application server runtime environment (SRE) 214 that runs behind an HTTP web server 219, and a real time, bidirectional, reliable messaging system 240 sending and receiving messages between the CRE 224 and SRE 214 over an HTTP web connection. The CRE 224 is protected by a client side firewall 244 and the SRE 214 is protected by a server side firewall 242. Messages pass through the normal firewall ports 80 (not shown) in the corresponding client side firewall and server side firewall. An application contains a client side code 222 and a server side code 212. In one example the client side application code 222 and the server side application code 212 contain XML documents and scripts. The CRE 224 maintains the state of the client side application in an XML client side Document Object Model (DOM) 226. DOM 226 provides an object orientated way of representing a document and defines what attributes are associated with each object, and how the objects and attributes can be manipulated. The SRE 214 also maintains the state of the server side application in a server side DOM 216. The client side DOM 226 and the server side DOM 216 synchronize each other automatically via the real time bidirectional messaging 240 without requiring any additional changes in the client side firewall 244 or the server side firewall 242.

The CRE 224 includes, in addition to the DOM 226, a communications module 225, a state synchronization and persistency module 228 and other functional modules 227 such as an Extensible Markup Language (XML) parser, a user interface, storage, security, and an execution engine. The XML Parser is responsible for parsing XML documents that come from the application server 210. The parsing results may be stored in the client side DOM 226 as part of the application's client side state. The user interface module is responsible for displaying the user interface and interacting with the user according to the application's XML description. The execution engine module is capable of running client side application code 222 that comes from XML documents on the application server 210. As mentioned, DOM 226 represents the application's client side state and is updated by the CRE automatically. The synchronization and persistency module 228 is responsible for synchronizing the DOM 226 with the application server 210, and saving and/or retrieving the DOM 226 from persistent storage.

The SRE 214 runs behind the HTTP web server 219 and inside the application server 210. The SRE 214 is architecturally similar to the CRE 224. It includes in addition to the server side DOM 216, a communications module 215, a synchronization and persistency module 218 and other functional modules 217. Most of these modules play the same role as their equivalent on the client side. The server side DOM 216 is constructed by parsing XML documents that are sent to the SRE 214. As a result, the server side DOM 216 mirrors the client side of the application's state and makes it available to the server side application code 212. Furthermore, when the server side application code 212 modifies the server side DOM 216 the SRE 214 sends a message to the client side of the application so that the client side DOM 226 also gets updated. When the client side application code 222 or the user changes the client side DOM 226, the CRE 224 sends a message to the SRE 214 so that the server side DOM 216 is synchronized. There are some additional modules such as an application server interface module and a clustering module. The application server interface module enables the SRE 214 to run inside the application server 210 and enables applications inside the application server 210 to access the SRE's functionalities. The clustering module provides support for clustering the SRE.

Figure 3:
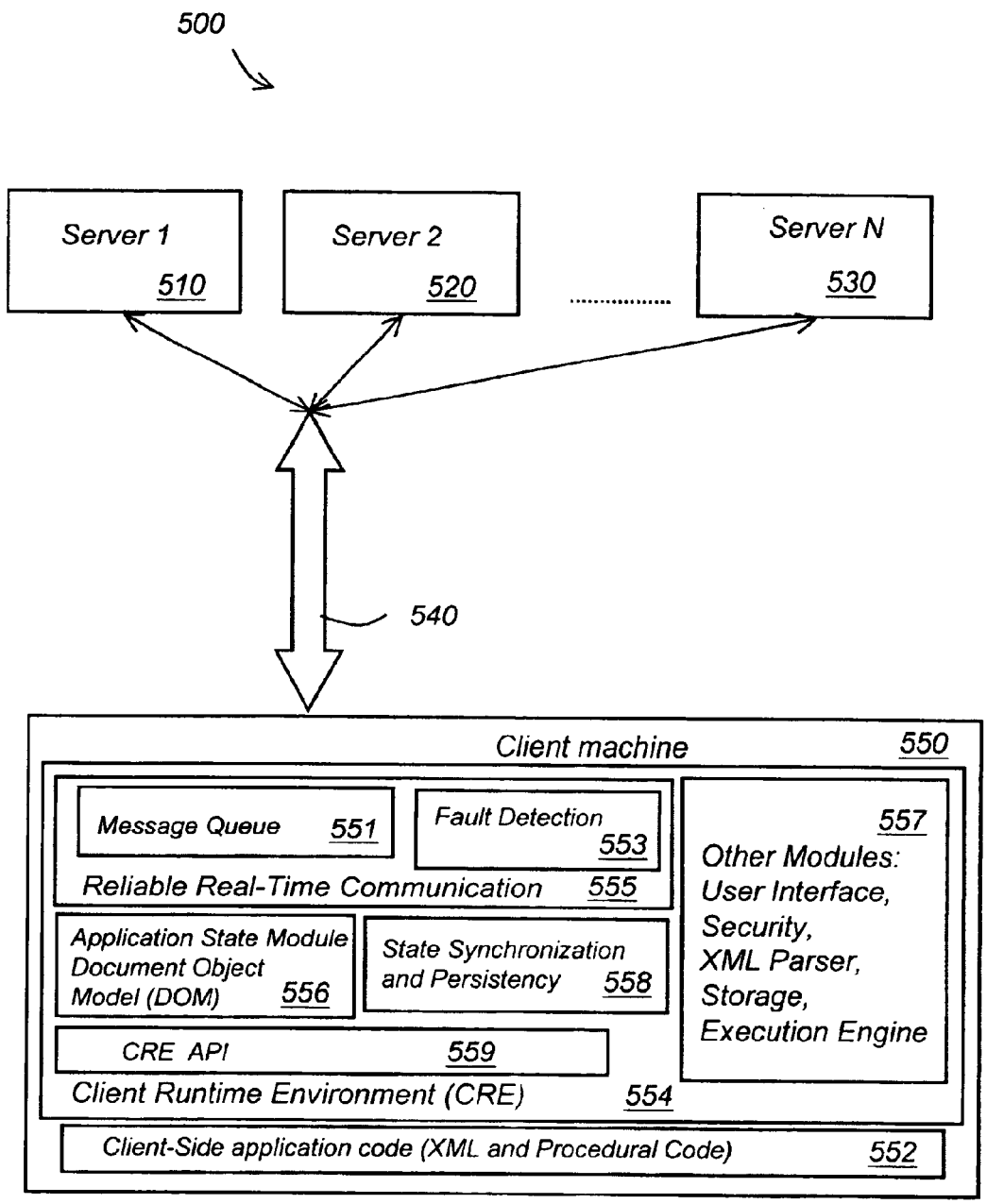
FIG. 3 is a block diagram of another embodiment of a stateful computing system of this invention.

Stateful computing according to this invention is also applied to a distributed computing system that includes a client machine networked with a plurality of servers. Referring to FIG. 3, the distributed computing system 500 includes a client machine 550 and servers 1 to N, where N is an integer number larger than zero, 510, 520, . . . 530. Client machine 550 is networked with servers 1 to N via a network 540. Network 540 may be either a wireless or a wired network and the communication may be HTTP or TCP. The client machine 550 includes a CRE 554 and a client side application code 552. The client side application code includes XML and script pages. The CRE 554 includes a DOM 556 for maintaining the state of the client side of an application, a communication module 555, a state synchronization and persistency module 558 and other functional modules 557 such as an Extensible Markup Language (XML) parser, a user interface, storage, security, and an execution engine. The XML Parser is responsible for parsing XML documents that come from the servers 1 to N. The parsing results may be stored in the client side DOM 556 as part of the application's client side state. The user interface module is responsible for displaying the user interface and interacting with the user according to the application's XML description. The execution engine module is capable of running the client side application code 552. The synchronization and persistency module 558 is responsible for synchronizing the DOM 556 with the servers 1 to N, and saving and/or retrieving the DOM 556 from persistent storage. In one example, servers 1 to N run web services and client machine 550 is a web service consumer.

Figure 6A:
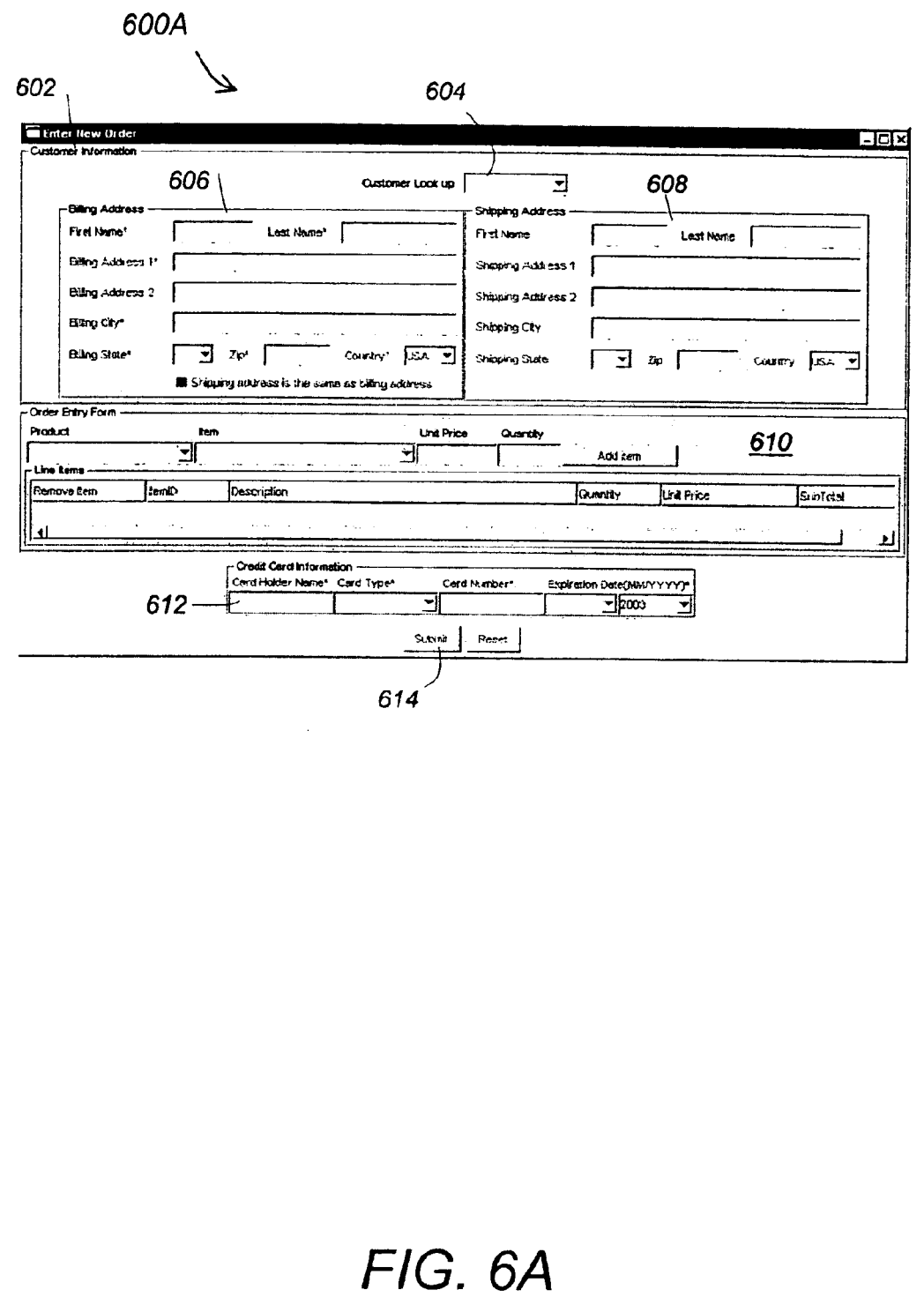

Application code designed to run on the distributed computing platforms of FIG. 2, FIG. 3 and FIG. 4 is similar to today's HTML web application code, i.e., the database tier and server side business logic tier are handled by the application server. In one example, the presentation tier is developed using Java Server Pages and Servlets. The difference in the present invention is that the user interface of the application is described using XML instead of HTML. In one example, the application code for an initial XML markup document that displays the initial screen form shown in FIG. 6A is as follows. Initial XML markup document:

```
<xml>
    <remove id="mypopup"/>
    <popupmenu id="mypopup" location="10,10" bgcolor="white" bordercolor="red"
borderstyle="solid" borderwidth="1" visible="false">
        <menuitem text="Status: Incomplete" font="Tahoma,bold,12" fgcolor="red" />
        <separator />
        <panel>
```

```
                    <panel>
                    <panel>
                      <label font="Tahoma,bold,12" fgcolor="red" text="Credit Card"/>
                      <label id="popup__cc__name" text="Empty card holder" visible="false"/>
                      <label id="popup__cc__no" text="Empty or invalid card number"
visible="false"/>
                      <label id="popup__cc__type" text="Empty card type" visible="false"/>
                      <label id="popup__cc__mm" text="Empty card month" visible="false"/>
                      <label id="popup__cc__ok" text="OK" font="Tahoma,bold,12" fgcolor="green"
visible="false"/>
                      <layoutmanager layout="boxlayout" orientation="vertical" align="start"/>
                    </panel>
                    <label img="./images/verticalline.gif"/>
                    <panel>
                      <label font="Tahoma,bold,12" fgcolor="red" text="Billing Address"/>
                      <label id="popup__b__fname" text="Empty first name" visible="false"/>
                      <label id="popup__b__lname" text="Empty last name" visible="false"/>
                      <label id="popup__b__addr1" text="Empty address line#1" visible="false"/>
                      <label id="popup__b__city" text="Empty city field" visible="false"/>
                      <label id="popup__b__state" text="Empty state field" visible="false"/>
                      <label id="popup__b__zip" text="Empty zip field" visible="false"/>
                      <label id="popup__b__country" text="Empty country field" visible="false"/>
                      <label id="popup__b__ok" text="OK" font="Tahoma,bold,12" fgcolor="green"
visible="false"/>
                      <layoutmanager layout="boxlayout" orientation="vertical" align="start"/>
                    </panel>
                    <label img="./images/verticalline.gif"/>
                    <panel>
                      <label font="Tahoma,bold,12" fgcolor="red" text="Shipping Address"/>
                      <label id="popup__s__fname" text="Empty first name" visible="false"/>
                      <label id="popup__s__lname" text="Empty last name" visible="false"/>
                      <label id="popup__s__addr1" text="Empty address line#1" visible="false"/>
                      <label id="popup__s__city" text="Empty city field" visible="false"/>
                      <label id="popup__s__state" text="Empty state field" visible="false"/>
                      <label id="popup__s__zip" text="Empty zip field" visible="false"/>
                      <label id="popup__s__country" text="Empty country field" visible="false"/>
                      <label id="popup__s__ok" text="OK" font="Tahoma,bold,12" fgcolor="green"
visible="false"/>
                      <layoutmanager layout="boxlayout" orientation="vertical" align="start"/>
                    </panel>
                    <layoutmanager layout="boxlayout" orientation="horizontal"
align="stretch"/>
                  </panel>
          <layoutmanager layout="boxlayout" orientation="vertical"/>
                </panel>
 </popupmenu>
<mco id="formhandler" src="com.nexaweb.samples.orderdemo.FormHandler"/>
<remove id="newOrderForm"/>
<remove id="newodercustomerbox"/>
<window id="newOrderForm" title="Enter New Order" size="850,520" location="20,20"
focused="true" onclose="processOrder.do?command=closeNewOrder" modal="true">
          <panel bordertitle="Customer Information" borderwidth="2"
titlejustification="left" borderstyle="groove" margin="3,3,3,3">
                <panel>
                <panel id="newordercustomerlookup">
                        <label text="Customer Look up"/>
                        <combobox id="combo__newordercustomerbox" size="100,20"
oncommand="processOrder.do?command=populateaddress">
                           <listbox id="newodercustomerbox">
                             <listitem id="newordercustomer-0" text="New Customer"/>
                             <listitem id="newordercustomer-1" text="Mike Adam"/>
                             <listitem id="newordercustomer-2" text="Jyothi Smith"/>
                             <listitem id="newordercustomer-3" text="Nancy Doss"/>
                             <listitem id="newordercustomer-4" text="Steve Job"/>
                             <listitem id="newordercustomer-5" text="Bill Gates"/>
                             <listitem id="newordercustomer-6" text="Kevin Sab"/>
                             <listitem id="newordercustomer-7" text="Bill Clinton"/>
                             <listitem id="newordercustomer-8" text="Catherine Zeta-Jones"/>
                           </listbox>
                         </combobox>
                                 <layoutmanager layout="flowlayout" justifyh="left"/>
                </panel>
                        <layoutmanager layout="flowlayout" justifyh="left"/>
                </panel>
                <panel id="neworderbillingshippingpanel"
src="neworderbillingshipping.xml"/>
                <layoutmanager layout="boxlayout" orientation="vertical"
align="stretch"/>
                </panel>
```

-continued

```
        <panel bordertitle="Order Entry Form" borderwidth="2"
titlejustification="left" borderstyle="groove" margin="3,3,3,3">
            <!-- add line item -->
            <panel layoutpos="north">
            <label text="Product"
layoutpos="1,1,1,1,1.0,0,west,horizontal,0,0,0,0,0,0"/>
            <label text="Item" layoutpos="2,1,1,1,1.0,0,west,horizontal,0,0,0,0,0,0"/>
            <label text="Unit Price"
layoutpos="3,1,1,1,1.0,0,west,horizontal,0,0,0,0,0,0"/>
            <label text="Quantity" size="50,20"
layoutpos="4,1,1,1,1.0,0,west,horizontal,0,0,0,0,0,0"/>
            <label text="" layoutpos="5,1,1,1,1.0,0,west,horizontal,0,0,0,0,0,0"/>
            <label text="" layoutpos="6,1,1,1,1.0,0,west,horizontal,0,0,0,0,0,0"/>
        <combobox id="cbbProduct" size="150,20"
layoutpos="1,2,1,1,1.0,0,west,horizontal,0,0,0,0,0,0"
oncommand="processOrder.do?command=getItems">
            <listbox id="lbProduct" >
              <listitem id="liProduct-1" text="Digital Cameras"/>
              <listitem id="liProduct-2" text="Laptops"/>
              <listitem id="liProduct-3" text="Game Console"/>
            </listbox>
        </combobox>
        <combobox id="cbbItem" enabled="false" size="200,20"
layoutpos="2,2,1,1,1.0,0,west,horizontal,0,0,0,0,0,0">
            <listbox id="lbItem">
            <listitem text="dummy"/>
            </listbox>
        </combobox>
        <textbox id="neworder-unitprice" text="" enabled="false" justifyh="right"
layoutpos="3,2,1,1,1.0,0,west,horizontal,0,0,0,0,0,0"/>
            <textbox id="neworder-qty" text="" size="50,20" enabled="false"
justifyh="right" layoutpos="4,2,1,1,1.0,0,west,horizontal,0,0,0,0,0,0"/>
            <button id="btnadditem" text="Add item" size="100,20"
oncommand="processOrder.do?command=addItem" enabled="false"
layoutpos="5,2,1,1,1.0,0,west,horizontal,0,0,0,0,0,0"/>
            <label text="" size="200,20"
layoutpos="6,2,1,1,1.0,0,west,horizontal,0,0,0,0,0,0"/>
            <layoutmanager layout="gridbaglayout"/>
        </panel>
        <panel id="newOrderCartPanel" layoutpos="center" bordertitle="Line Items"
borderwidth="2" titlejustification="left" borderstyle="groove" margin="3,3,3,3"
enabled="false">
            <table id="tblnewOrderItems" size="600,60" altbgcolor="177,182,243"
layoutpos="center" onedit="mco:formhandler.onQtyEdit(2)">
                <col><header size="80,20" text="Remove Item"/></col>
                <col><header size="50,20" text="ItemID"/></col>
                <col><header text="Description" size="300,20" /></col>
                <col><header size="50,20" text="Quantity"/></col>
                <col><header size="100,20" text="Unit Price"/></col>
                <col><header size="100,20" text="SubTotal"/></col>
            </table>
            <layoutmanager layout="borderlayout"/>
        </panel>
        <layoutmanager layout="borderlayout"/>
        </panel>
        <panel id="neworderccpanel" src="newordercc.xml "/>
        <panel id="newOrderButtonPanel">
            <button id="neworderbtnSubmit" popup="mypopup" text="Submit"
onmouseover="mco:formhandler.handleMouseOver( )"
onmouseout="mco:formhandler.handleMouseOut( )" enabled="false"/>
            <button id="neworderbtnReset" text="Reset" enabled="false"/>
        </panel>
<layoutmanager layout="boxlayout" orientation="vertical" align="stretch"/>
</window>
</xml>
```

Figure 6B:
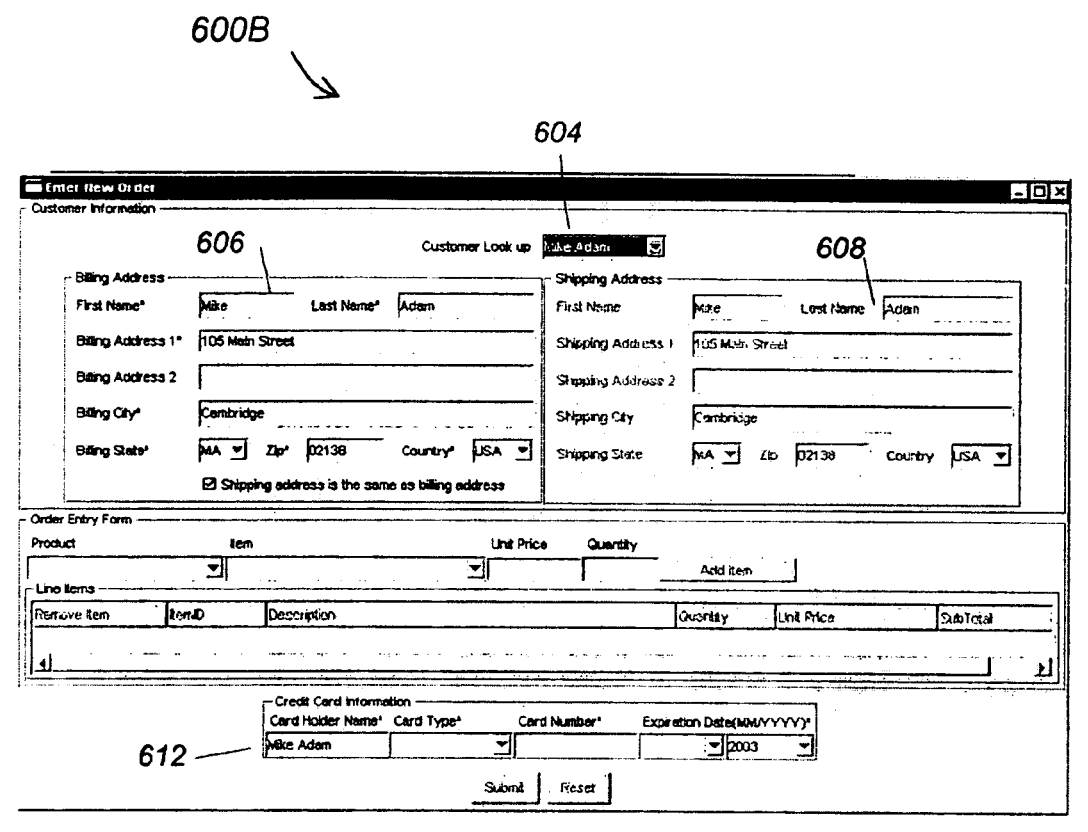

All of the application code is initially stored on the application server 210. Upon receiving the initial XML markup document from the application server 210, the client browser 220 displays the initial screen form 600A, shown in FIG. 6A. In this example the initial screen form 600A is a new order entry form that includes customer information 602 and a customer look up tab 604. The customer information 602 includes billing address information 606, shipping address information 608, order information 610, and payment card information 612. The billing address information 606 includes customer's first and last name and billing address. The shipping information 608 includes first and last name of the person to whom the product will be shipped and the shipping address. The order information 610 includes, the item identification, item description, quantity, unit price, and total price. The credit card information 612 includes credit card holder's name, card type, card number, and expiration date. The user interacts with the initial form 600A by entering the information in the appropriate fields. The user may also look up the name of a customer whose information is already stored in the application server 210. For example, the user may click on the look up tab 604, select the customer name "Mike Adam" and click the submit button 614 at the bottom of the form 600A. The client browser 220 will send the user input to the application server 210 and the application server 210 will retrieve the information and merge the requested information with the initial screen 600A thereby generating the new screen 600B, shown in FIG. 6B. The code for requesting the second XML markup document is as follows:

```
<xml>
<panel id="neworderbillingpanel" enabled="true"/>
<panel id="newordershippingpanel" enabled="true"/>
<panel id="neworderccpanel" enabled="true"/>
<panel id="newOrderCartPanel" enable="true"/>
<textbox id="b_fname" text="Mike" bgcolor="white"/>
<textbox id="b_lname" text="Adam" bgcolor="white"/>
<textbox id="b_addr1" text="105 Main Street" bgcolor="white"/>
<textbox id="b_addr2" text="" bgcolor="white"/>
<textbox id="b_city" text="Cambridge" bgcolor="white"/>
<combobox id="combo_b_state" text="MA" bgcolor="white"/>
<textbox id="b_zip" text="02138" bgcolor="white"/>
<combobox id="combo_b_country" text="USA" bgcolor="white"/>
<textbox id="cc_name" text="Mike Adam" bgcolor="white"/>
<textbox id="s_fname" text="Mike"/>
<textbox id="s_lname" text="Adam"/>
<textbox id="s_addr1" text="105 Main Street"/>
<textbox id="s_addr2" text=""/>
<textbox id="s_city" text="Cambridge"/>
<combobox id="combo_s_state" text="MA"/>
<textbox id="s_zip" text="02138"/>
<combobox id="combo_s_country" text="USA"/>
</xml>
```

The screen display 600B generated from the process of merging the second XML markup document with the first XML markup document includes the previously stored customer billing address information 606, the shipping information 608, and the credit card information 612. The user may now enter the order information and submit it to the application server 210 through the client side browser 220.

Figure 5A:
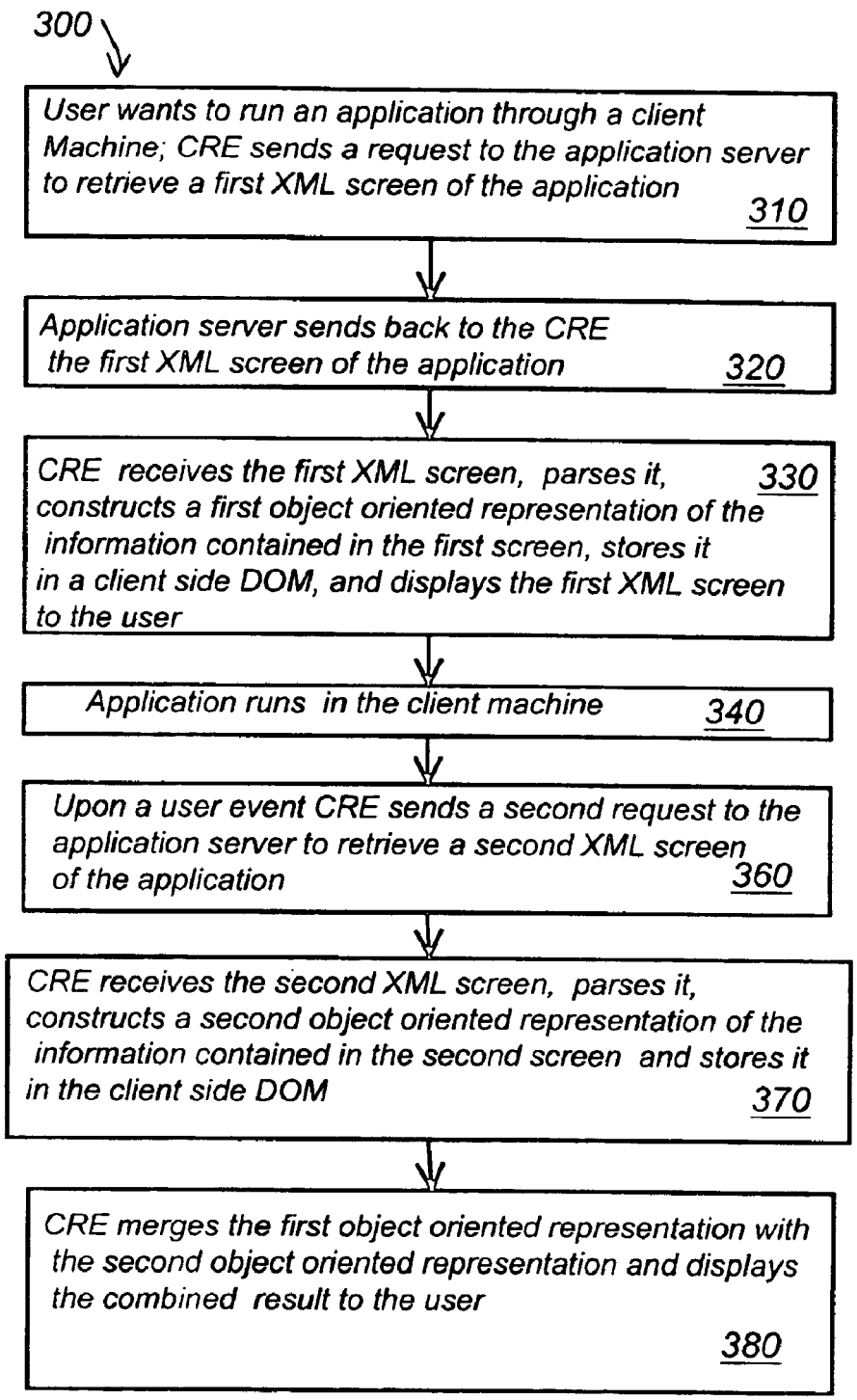
FIG. 5A is a block diagram of the method of running an application in the computing system of FIG. 2.

Referring to FIG. 3 and FIG. 5A, the process 300 of running an application through a client machine 550 and maintaining state of the application includes the following steps. When a user wants to run an application through the client machine 550, the CRE 554 sends a request to an application server 510 to retrieve the XML description of an initial screen of the application (310). The application server 510 responds to this request by sending back to the client machine 550 the initial XML screen (320). The CRE 554 receives this XML document, parses it, and constructs a first object oriented representation of the information contained in the initial screen. The CRE 554 stores the first object oriented representation of the information in a client side DOM 556 for tracking the client side state of the application and displays the application's initial screen to the user (330). Next, the user runs the application in the client machine (340). According to the application's XML description, the CRE 554 may invoke client-side scripts or server-side event handlers to process some of the user events. Upon receiving a user event the CRE 554 sends a second request to the application server 510 to retrieve a second XML screen of the application (360). The CRE 554 receives the second XML screen, parses it, constructs a second object oriented representation of the information contained in the second screen and stores it in the client side DOM 556 (370). Next, the CRE 554 merges the first and second object oriented representations, creates a new object oriented representation of the information contained in the first or second screens and displays the combined result in the client machine 550 (380). This process is repeated so that all further responses received from the scripts or server-side event handlers are further processed by the CRE 554, which will then update the client side DOM 556 and display the result accordingly to the user. If a persistent connection is needed for this application such a connection is established between the client machine 550 and server 510. If there is a client-side business logic defined 552, such business logic is loaded into the CRE 554, cached, and executed accordingly.

Figure 5B:
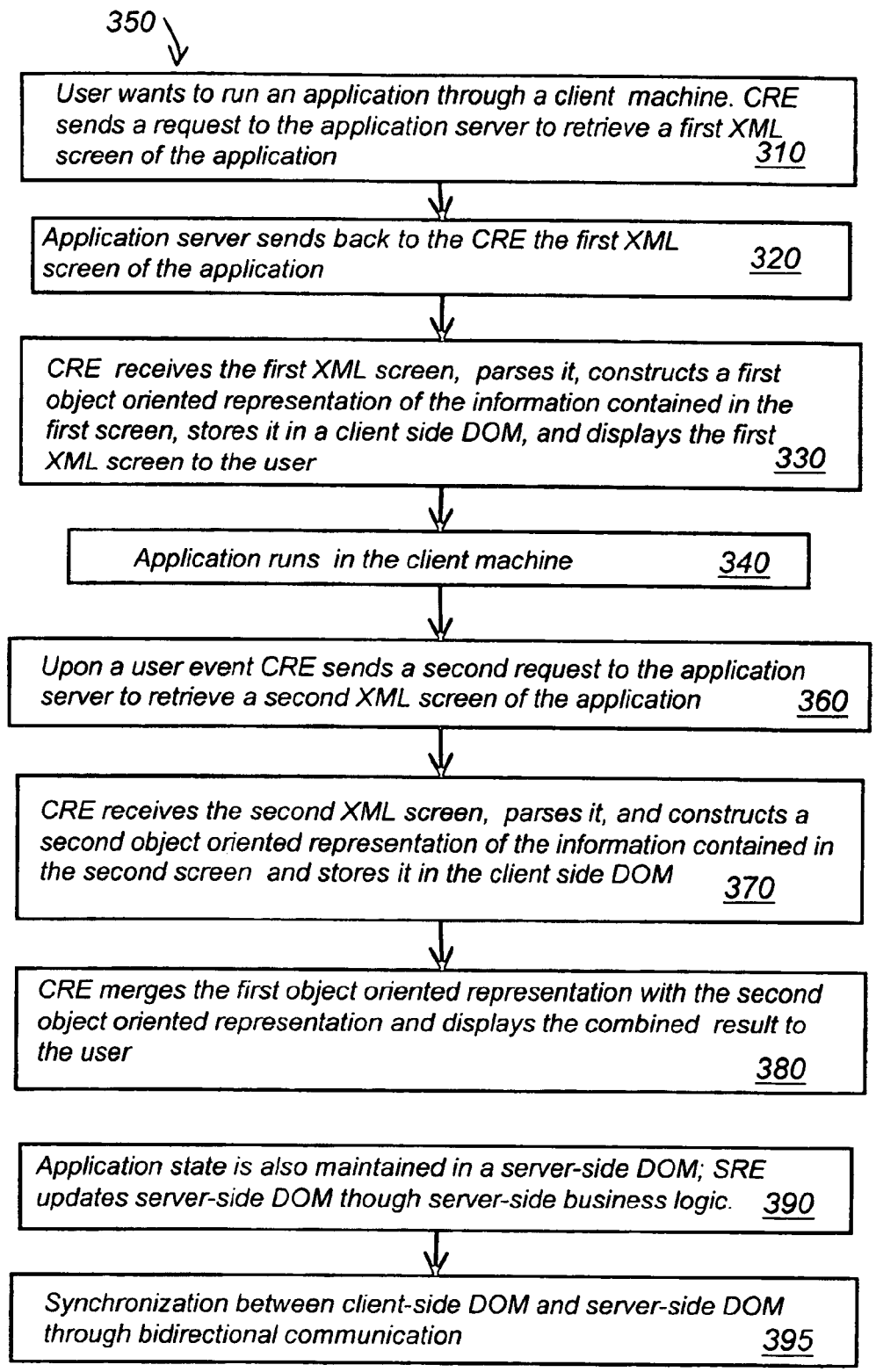
FIG. 5B is a block diagram of the method of running an application in the computing system of FIG. 4.

Referring to FIG. 4 and FIG. 5B, when an application is running in the CRE 224, its state is maintained in the client machine's XML DOM 226. When the user interacts with the application, the CRE 224 updates the client side DOM 226 accordingly to reflect the user's inputs. In the embodiment of FIG. 4, the application's state is also maintained on the application server's DOM 216. When the application's server-side business logic 212 decides to change the state of the application, for example, make a Window invisible, the SRE 214 automatically updates the server side DOM 216 (390). Whenever either DOM 226, 216 has been updated, either the CRE 224 or the SRE 214 will send a message to the other party to synchronize its DOM 226, 216 (395). When the network is disconnected, both the client side of the application and the server side of the application continue to function. Changes of the application state are maintained in the corresponding DOMs 226, 216. When the network connection becomes available again, the CRE 224 and SRE 214 automatically synchronize the DOMs 226, 216, respectively.

The client and server communications, including DOM synchronization and application logic initiated messages, are all delivered via the real-time, bi-directional, reliable communication over HTTP 240. The HTTP communication model itself is a request/response model that does not enable bi-directional communications. According to the prior art HTTP communication model a user places a request from a client machine to a web server and the client machine opens a one way communication thread to the web server for transmitting the user's request. In the next sequence the web server processes the user's request and responds to the client machine using the previously opened communication thread in the reverse direction. After the response is delivered the communication thread is closed. In this prior art communication model the server cannot initiate a communication thread to the client machine without first receiving a request and therefore it does not allow for a "server push" delivery of information. There are various HTTP tunneling techniques available but they require special client or server software and have potential security problems.

Figure 7:
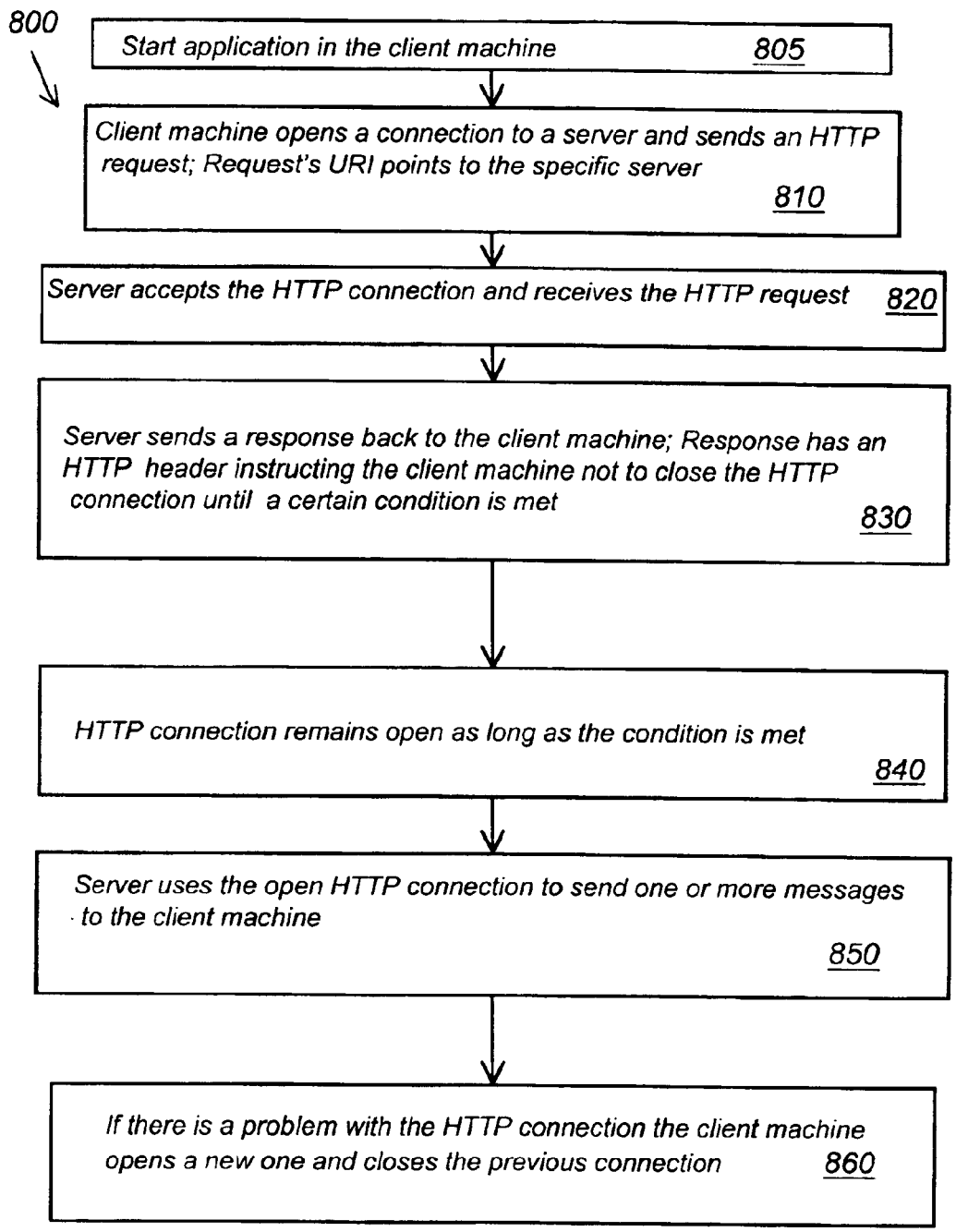
FIG. 7 is a block diagram of the 'server-push" method of this invention.

In the present invention the communication model between the client machine and the application server is built on top of HTTP but it overcomes the usual HTTP limitations of being unreliable and client-pull only. It is also 100% compatible with the existing web infrastructure and requires zero changes to the client side and the server side firewalls. The present invention enables "server push" by making the response to a client request a persistent connection. Referring to FIG. 7, this invention enables persistent connection and "server push" according to the following process 800. When an application is started (805), the client machine opens a communication thread to a server via a normal HTTP request (810). The request's Uniform Resource Identifier (URI) points to a specific application server. A special predetermined request parameter indicates that this request is to establish a persistent connection. The server accepts the HTTP connection and receives the HTTP request (820). Next, the server sends back to the client machine a response that has an HTTP header instructing the client machine not to close the HTTP connection until a certain condition is met (830). The HTTP connection remains open as long as the certain condition is met (840). The server use this open HTTP connection to do "server-push", i.e., to send one or more messages to the client machine, without the client machine having to send a request (850). Examples of HTTP headers instructing the client machine to keep the HTTP connection open until a certain condition is met include the following. In one example, the HTTP header "content-type" is set to be "multipart" and the certain condition is the end of the "multipart" response.

Code example for a "multipart" response:

HTTP/1.1 200 OK content-type: multipart/mixed;boundary=a

In another example, the HTTP header "content-length" is set to be to a very large number, i.e., 5,000,000 bytes, or larger than the sum of the content length of all messages that the server wants to push to the client machine.

Code example for very large content length response:

HTTP/1.1 200 OK content-length: 5000000 bytes

In another example the HTTP header "transfer-encoding" is set to be "chunked" and the certain condition defines the end of the "chunked" response.

Code example for chunked response:

HTTP/1.1 200 OK content-type: text/html

Transfer-Encoding: chunked

Once established, this persistent communication thread between the server and the client machine allows the server to send any type of message to the client machine, i.e., to do "server push". Whenever the client machine detects a problem with the persistent connection, it simply opens a new one and closes the previous connection (860).

Messaging reliability is achieved by using message queue and by attaching a unique identification (ID) to each message. Both the CRE 224 and the SRE 214 maintain their own message queue 221, 211, respectively, shown in FIG. 2. Whenever a message is delivered, a unique ID is attached to the message. The message is not removed from the message queue until an acknowledgement from the other party is received acknowledging the receipt of this particular message ID. If no acknowledgement is received after a certain period of time, the message will be delivered again. The receiving party receives messages and immediately sends an acknowledgement of the receipt of this message ID to the sending party. The received message ID is kept in memory for a certain period of time. If a message with the same ID is received again within this period of time, the new message is discarded. This avoids the same message being processed multiple times.

Other embodiments are within the scope of the following claims. For example, the SRE 214 may also run outside the application server 210. Examples of business applications that could be delivered over the described distributed web-based system 200 include among others Microsoft Word for word processing applications, Microsoft Excel for spreadsheet applications, financial trading software used by portfolio managers in financial institutions, and claim processing applications used in the insurance industry.

Several embodiments of the present invention have been described. Nevertheless, it will be understood that various modifications may be made without departing from the spirit and scope of the invention. Accordingly, other embodiments are within the scope of the following claims.

What is claimed is:

1. A computing system for performing stateful distributed computing comprising:

a client machine comprising a Client Runtime Environment (CRE); and wherein said CRE is adapted to maintain state of an application by retrieving a first markup document of said application, creating and storing a first object oriented representation of information contained in said first markup document, wherein said first object oriented representation defines a first state of said application, retrieving a second markup document, creating and storing a second object oriented representation of information contained in said second markup document, and merging said first and said second object oriented representations thereby forming a new object oriented representation of information contained in said first or said second markup documents and wherein said new object oriented representation defines a new state of said application.

2. The system of claim 1 wherein said CRE further updates said new state of said application by retrieving one or more additional markup documents, creating and storing one or more additional object oriented representations of information contained in said one or more additional markup documents, respectively, and merging said one or more additional object oriented representations with said new object oriented representation thereby forming an updated state of said application.

3. The system of claim 1 wherein any of said object oriented representations comprise a structure selected from a group consisting of a user interface, a data structure, and business logic.

4. The system of claim 1 wherein said CRE further retrieves one or more procedural codes associated with any of said markup documents and executes said one or more procedural codes.

5. The system of claim 4 wherein said CRE further comprises an Application Program Interface (API) and said one or more procedural codes utilize said API for maintaining state of said application programmatically.

6. The system of claim 4 wherein said one or more procedural codes are written in a programming language selected from a group consisting of C, C++, C#, Java, Javascript, VBScript, ActionScript, Visual Basic, and a proprietary programming language.

7. The system of claim 4 wherein said one or more procedural codes comprise binary format and said binary format is selected from a group consisting of .NET CLR, Java.class format, and Macromedia Flash binary format.

8. The system of claim 4 wherein said one or more procedural codes comprise text format and said text format is selected from a group consisting of HTML, XML. plain text, and compressed text.

9. The system of claim 4 wherein any of said one or more procedural codes and any of said markup documents are compiled and combined into a set of procedural code and said set of procedural code is retrieved and executed by said CRE.

10. The system of claim 1 wherein said application state is maintained in a Document Object Model (DOM).

11. The system of claim 1 wherein any of said markup documents comprises an Extensible Markup Language (XML) format.

12. The system of claim 1 wherein any of said markup documents comprises a Hyper Text Markup Language (HTML) format.

13. The system of claim 1 wherein said merging comprises one or more operations selected from a group consisting of add, remove, insert, change, substitute, update, combine and combinations thereof.

14. The system of claim 13 wherein any of said object oriented representations comprise objects, object attributes, object attribute values, object hierarchical relationships and combinations therefore and said one or more operations are applied to said objects, said object attributes, said object attribute values, said object hierarchical relationships and said combinations thereof.

15. The system of claim 1 wherein one or more of said markup documents are compiled into a procedural code and said procedural code is retrieved and executed by said CRE.

16. The system of claim 1 further comprising a real-time, bi-directional messaging system for sending and receiving messages between said client machine and a server over a network.

17. The system of claim 16 wherein said network comprises the World Wide Web (web).

18. The system of claim 16 wherein said network comprises a wireless network.

19. The system of claim 1 further comprising a web browser and said CRE runs inside said web browser.

20. The system of claim 1 further comprising a web browser and said CRE runs outside said web browser.

21. The system of claim 1 wherein said client machine is selected from a group consisting of a desktop computer, a laptop computer, a handheld device, and a smart phone.

22. The system of claim 1 further comprising one or more servers and said client machine is adapted to retrieve any of said markup documents from any of said one or more servers.

23. A computing method for maintaining state of an application in a client machine comprising:
retrieving a first markup document of said application;
creating a first object oriented representation of information contained in said first markup document and storing said first object oriented representation, wherein said first object oriented representation defines a first state of said application;
retrieving a second markup document of said application;
creating a second object oriented representation of information contained in said second markup document and storing said second object oriented representation; and
merging said first and said second object oriented representations there by forming a new object oriented representation of information contained in said first or said second markup document and wherein said new object oriented representation defines a new state of said application.

24. The method of claim 23 further comprising updating said new state of said application by retrieving one or more additional markup documents, creating and storing one or more additional object oriented representations of information contained in said one or more additional markup documents, and merging said one or more additional object oriented representations with said new object oriented representation thereby forming an updated state of said application.

25. The method or claim 23 wherein any of said object oriented representations comprise a structure selected from a group consisting of a user interface, a data structure, and business logic.

26. The method of claim 23 further comprising retrieving one or more procedural codes associated with any of said markup documents and executing said one or more procedural codes.

27. The method of claim 26 wherein said one or more procedural codes utilizes an Application Program Interface (API) for maintaining state of said application programmatically.

28. The method of claim 26 wherein said one or more procedural codes is written in a programming language selected from a group consisting of C, C++, C#, Java, Javascript, VBScript, ActionScript, Visual Basic, and a proprietary programming language.

29. The method of claim 26 wherein said one or more procedural codes comprise binary format and said binary format is selected from a group consisting of .NET CLR, Java.class format, and Macromedia Flash binary format.

30. The method of claim 26 wherein said one or more procedural codes comprise text format and said text format is selected from a group consisting of HTML, XML, plain text, and compressed text.

31. The method of claim 26 wherein any of said one or more procedural codes and any of said markup documents are compiled and combined into a set of procedural code and said set of procedural code is retrieved and executed by said client machine.

32. The method of claim 23 wherein said application state is maintained in a Document Object Model (DOM).

33. The method of claim 23 wherein any of said markup documents comprises an Extensible Markup Language (XML) format.

34. The method of claim 23 wherein any of said markup documents comprises a Hyper Text Markup Language (HTML) format.

35. The method of claim 23 wherein said merging comprises executing one or more operations selected from a group consisting of add, remove, insert, change, substitute, update, combine and combinations thereof.

36. The method of claim 35 wherein any of said object oriented representations comprise objects, object attributes, object attribute values, object hierarchical relationships and combinations therefore and said one or more operations are applied to said objects, said object attributes, said object attribute values, said object hierarchical relationships and said combinations thereof.

37. The method of claim 23 wherein one or more of said markup documents are compiled into a procedural code and said procedural code is retrieved and executed by said client machine.

38. The method of claim 23 further comprising sending an receiving messages between said client machine and a server over a network via a real-time bidirectional messaging system.

39. The method of claim 23 wherein said client machine is selected from a group consisting of a desktop computer, a laptop computer, a handheld device, and a smart phone.

40. The method of claim 23 further comprising one or more servers and said client machine is adapted to retrieve any one of said markup documents from any of said one or more servers.

41. A method for developing an application adapted to run within a client machine wherein said client machine utilizes a Client Runtime Environment (CRE) for maintaining state of said application comprising:
defining user interface screens of said application as markup documents, respectively;
retrieving a first markup document by said CRE;

creating a first object representation of information contained in said first markup document by said CRE, wherein said first object oriented representation defines a first state of said application;

retrieving a second markup document by said CRE;

creating a second object oriented representation of information contained in said second markup document by said CRE;

merging said first and second object oriented representations by said CRE thereby forming a new object oriented representation of information contained in said first or said second markup document wherein said new object oriented representation defines a new state of said application.

42. The method of claim 41 further comprising updating said new state of said application by retrieving one or more additional markup documents, creating and storing one or more additional object oriented representations of information contained in said one or more additional markup documents, and merging said one or more additional object oriented representations with said new object oriented representation thereby forming an updated state of said application.

43. The method of claim 42 wherein said CRE comprises an Application Program Interface (API) and said method further comprises manipulating any of said markup documents and said application state via said API.

44. The method of claim 41 further comprising:

developing business logic associated with any of said user interface screens into one or more procedural codes; and executing said one or more procedural codes by said CRE.

45. A method for deploying an application adapted to run within a client machine comprising:

deploying a Client Runtime Environment (CRE) in said client machine;

deploying said application on a central server, wherein said client machine is adapted to connect to said central server via a network and said central server is capable of serving requests from said CRE;

sending a first request from said CRE to said central server to download a first markup document of said application from said central server to said CRE;

creating and storing a first object oriented representation of said first markup document, wherein said first object oriented representation defines a first state of said application;

sending a second request from said CRE to said central server to download a second markup document of said application from said central server to said CRE;

creating and storing a second object oriented representation of said second markup document; and merging said first object oriented representation with said second object oriented representation thereby creating a new object oriented representation, wherein said new object oriented representation defines a new state of said application.

46. The method of claim 45 further comprising updating said new state of said application by retrieving one or more additional markup documents, creating and storing one or more additional object oriented representations of information contained in said one or more additional markup documents, and merging said one or more additional object oriented representations with said new object oriented representation thereby forming an updated state of said application.

47. The method of claim 45 further comprising downloading one or more procedural codes associated with any of said markup documents from said central server to said CRE and executing said one or more procedural codes by said CRE.

48. The method of claim 47 wherein said one or more procedural codes comprise binary format and said binary format is selected from a group consisting of .NET CLR, Java.class format, and Macromedia Flash binary format.

49. The method of claim 47 wherein said one or more procedural codes comprise text format and said text format is selected from a group consisting of HTML, XML, plain text, and compressed text.

50. The method of claim 45 wherein any of said markup documents and one or more procedural codes are compiled and combined into a set of procedural code and said set of procedural code is retrieved and executed by said CRE.

51. The method of claim 45 further comprising caching client side application code in said client machine wherein said client side application code comprises said downloaded first and second markup documents, said new object oriented representation, one or more procedural codes and data downloaded from said central server to said client machine.

52. A method for deploying an application adapted to run within a client machine comprising:

deploying a Client Runtime Environment (CRE) in said client machine;

deploying said application on a central server, wherein said client machine is adapted to connect to said central server via a network and said central server is capable of serving requests from said CRE;

compiling and combining one or more markup documents and one or more procedural codes into an entity;

sending a request from said CRE to said central server to download said entity from said central server to said CRE;

retrieving a first information of a first markup document from said entity;

creating and storing a first object oriented representation of said first information; wherein said first object oriented representation defines a first state of said application;

retrieving second information of a second markup document from said entity;

creating and storing a second object oriented representation of said second information; and merging said first object oriented representation with said second object oriented representation thereby creating a new object oriented representation, wherein said new object oriented representation defines a new state of said application.

53. The method of claim 52 further comprising updating said new state of said application by retrieving one or more additional information of one or more additional markup documents, respectively, from said entity, creating and storing one or more additional object oriented representations of said one or more additional information, respectively, and merging said one or more additional object oriented representations with said new object oriented representation thereby forming an updated state of said application.

54. The method of claim 52 further comprising retrieving/ one or more procedural codes associated with any of said markup documents from said entity and executing said one or more procedural codes by said CRE.

55. A distributed computing system for running an application over a network, wherein said application comprises a client side component and a server side component, said system comprising:

a client runtime environment (CRE) for running the client side component of the application and maintaining the client side application's state in a client side Document Object Model (DOM);

a server runtime environment (SRE) for running the server side component of the application and maintaining the server side application's state in a server side DOM; and wherein said client side DOM is automatically synchronized with said server side DOM.

56. The system of claim 55 further comprising a real-time bi-directional messaging system for sending and receiving messages between the CRE and the SRE.

57. The system of claim 56 wherein said automatic synchronization between the client side DOM and the server side DOM is performed via said real-time bi-directional messaging system.

58. The system of claim 56 wherein said real-time bi-directional messaging system comprises HTTP messages.

59. The system of claim 56 wherein said real-time bidirectional messaging system establishes a persistent connection between said CRE and said SRE.

60. The system of claim 55 wherein said CRE runs inside a web browser.

61. The system of claim 55 wherein said SRE runs outside an application server.

62. The system of claim 55 wherein said SRE runs inside an application server.

63. The system of claim 55 wherein said client side DOM and said server side DOM comprise an Extensible Markup Language (XML) format.

64. The system of claim 55 wherein said CRE runs outside a web browser.

65. The system of claim 55 wherein when a connection between said CRE and said SRE over said network is interrupted the CRE and the SRE keep track of changes in the client side DOM and the server side DOM, respectively, and synchronize them when said network connection is reestablished.

66. A distributed data storage system comprising:

a client side DOM for storing client side data;

a server side DOM for storing server side data;

a client side engine and a server side engine for synchronizing said client side DOM with said server side DOM and the reverse, respectively, over a network.

67. A method for performing 'server-push" of a plurality of messages from a server to a client machine comprising:

sending a normal HTTP request from said client machine to said server by opening an HTTP connection to said server;

accepting said HTTP connection by said server;

sending back to said client machine a response by said server wherein said response comprises an HTTP header instructing said client machine not to close said HTTP connection until a certain condition is met thereby maintaining said HTTP connection open;

sending one or more of said plurality of messages to said client machine by said server via said open HTTP connection; and wherein said HTTP header comprises a "Content-type" header field indicating that said server response is a "multipart" mime-type response and said certain condition comprises an end of said "multipart" mime-type response.

68. A method for performing 'server-push" of a plurality of messages from a server to a client machine comprising:

sending a normal HTTP request from said client machine to said server by opening an HTTP connection to said server;

accepting said HTTP connection by said server;

sending back to said client machine a response by said server wherein said response comprises an HTTP header instructing said client machine not to close said HTTP connection until a certain condition is met thereby maintaining said HTTP connection open:

sending one or more of said plurality of messages to said client machine by said server via said open HTTP connection; and wherein said HTTP header comprises a "Transfer-encoding" header field indicating that said server response is "chunked" and said certain condition comprises an end of said "chunked" response.

69. A communication system for performing 'server-push" from a web application running inside an application server comprising:

a server module adapted to run inside said application server and to receive a request and to send a response to said request via a network connection;

a client machine adapted to send said request to said server module and to receive said response to said request via said network connection;

wherein said server module performs 'server-push" of a plurality of messages to said client machine upon receipt of an HTTP request from said client machine and accepting an HTTP network connection opened by said client machine by sending back to said client machine a response comprising an HTTP header instructing said client machine not to close said HTTP network connection until a certain condition is met thereby maintaining said HTTP network connection open and then sending one or more of said plurality of messages to said client machine via said open HTTP network connection; and wherein said HTTP header comprises a "Content-type" header field indicating that said server response is a "multipart" mime-type response and said certain condition comprises an end of said "multipart" mime-type response.

70. The system of claim 69 wherein said application server is a J2EE application server and said web application is a Java web application.

71. The system of claim 69 wherein said application server is a .NET application server and said web application is a .NET web application.

72. The system of claim 69 wherein said server module is adapted to run behind said application server.

73. The system of claim 69 wherein said server module comprises an Application Program Interface (API) for sending messages to one or more client machines and said web application utilizes said API for performing 'server-push" to said one or more client machines.

74. A communication system for performing 'server-push" from a web application running inside an application server comprising:

a server module adapted to run inside said application server and to receive a request and to send a response to said request via a network connection;

a client machine adapted to send said request to said server module to receive said response to said request via said network connection;

wherein said server module performs 'server-push" of a plurality of messages to said client machine upon receipt of an HTTP request from said client machine and accepting an HTTP network connection opened by said client machine by sending back to said client machine a response comprising an HTTP header instructing said client machine not to close said HTTP network connection until a certain condition is met thereby maintaining said HTTP network connection open and then sending one or more of said plurality of messages to said client machine via said open HTTP network connecting; and wherein said HTTP header comprises a "Transfer-encoding" header field indicating that said server response is "chunked" and said certain condition comprises an end of said "chucked" response.

* * * * *